T. H. PATENALL & H. S. YOUNG.
RAILWAY SIGNALING SYSTEM.
APPLICATION FILED JULY 27, 1911.
1,060,118.
Patented Apr. 29, 1913.
3 SHEETS—SHEET 1.
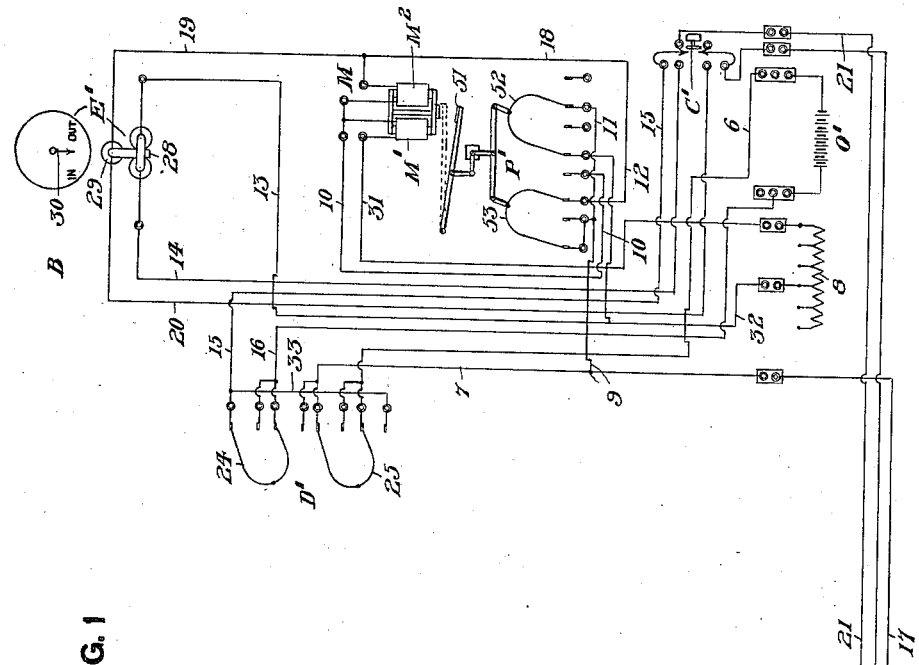
FIG. 1
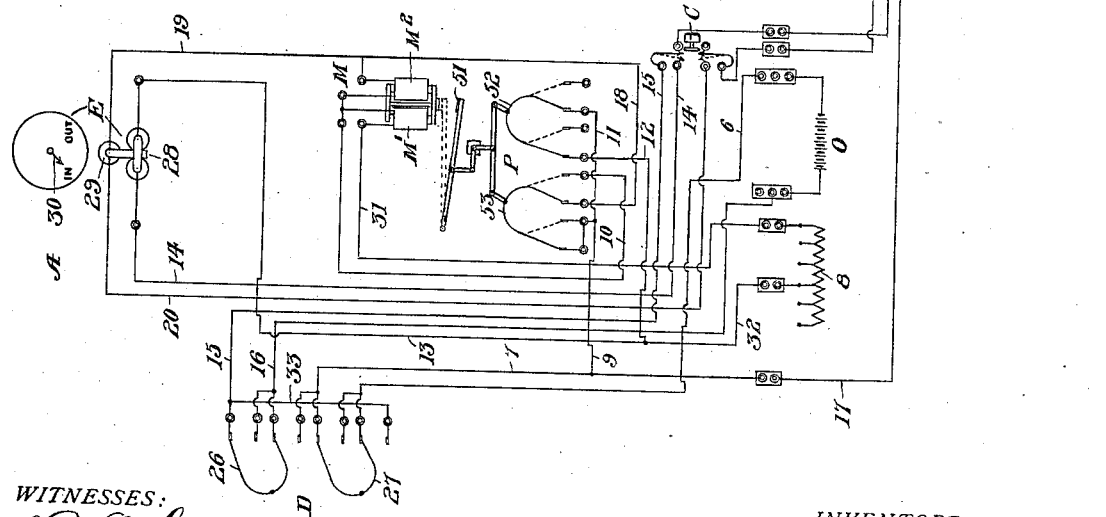
WITNESSES:
INVENTORS.
Thomas H. Patenall
and Henry S. Young
BY
their ATTORNEY.

T. H. PATENALL & H. S. YOUNG.
RAILWAY SIGNALING SYSTEM.
APPLICATION FILED JULY 27, 1911.

1,060,118.

Patented Apr. 29, 1913.

3 SHEETS—SHEET 3.

UNITED STATES PATENT OFFICE.

THOMAS H. PATENALL, OF HOLLIS, NEW YORK, AND HENRY S. YOUNG, OF JERSEY CITY, NEW JERSEY, ASSIGNORS TO THE UNION SWITCH & SIGNAL COMPANY, OF SWISSVALE, PENNSYLVANIA, A CORPORATION OF PENNSYLVANIA.

RAILWAY SIGNALING SYSTEM.

1,060,118.
Specification of Letters Patent.
Patented Apr. 29, 1913.

Application filed July 27, 1911. Serial No. 640,802.

*To all whom it may concern:*

Be it known that we, THOMAS H. PATENALL and HENRY S. YOUNG, citizens of the United States, residing, respectively, at Hollis, Queens county, State of New York, and Jersey City, Hudson county, State of New Jersey, have invented certain new and useful Improvements in Railway Signaling Systems, of which the following is a specification.

Our invention relates to signaling systems for controlling traffic on railways, especially single track railways, which systems embody apparatus known in the art as "staff instruments."

In the present invention, as in others of a similar nature, a staff instrument is located at each end of the section of track to be protected, the two instruments being connected by appropriate electric circuits so arranged that the mechanism in one instrument can be manipulated to release a staff therefrom only when no staff is out of either of the two instruments. Our present invention relates more particularly to systems of this nature for which no special operators are required, the circuits being so arranged to control the mechanism that when no staff is out of either of the two instruments, a staff can be released from either instrument without the sanction or coöperation of an operator at the other instrument.

We will describe a system embodying our invention, and then point out the novel features thereof in claims.

Figure 2:
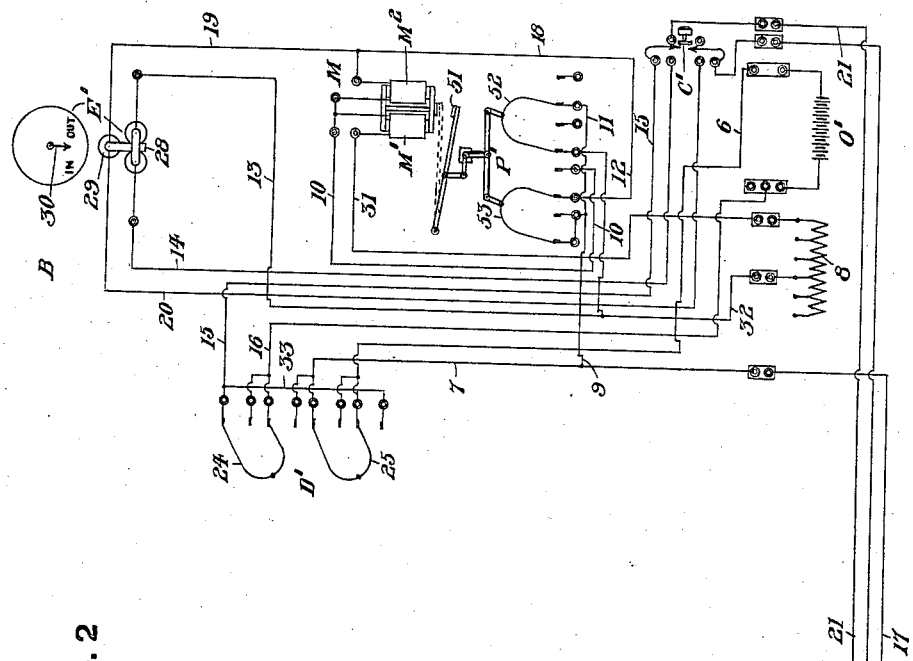
Figure 3:
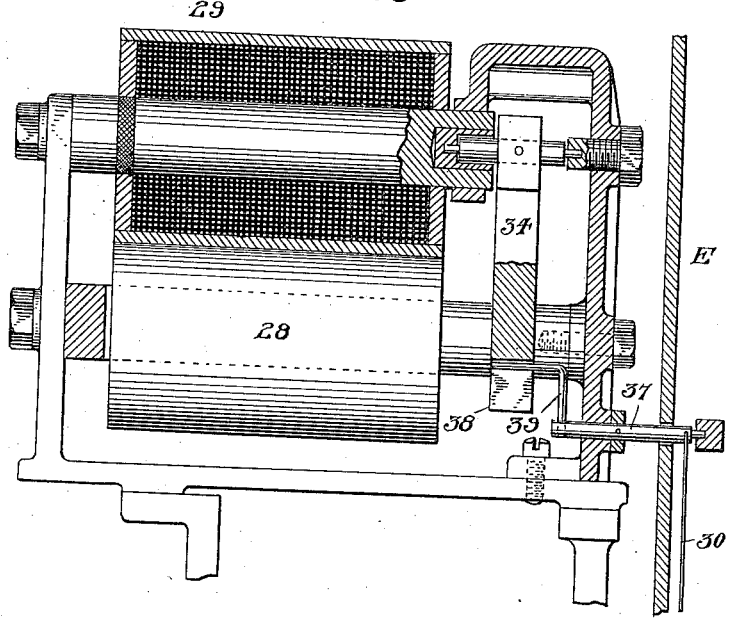
Figure 4:
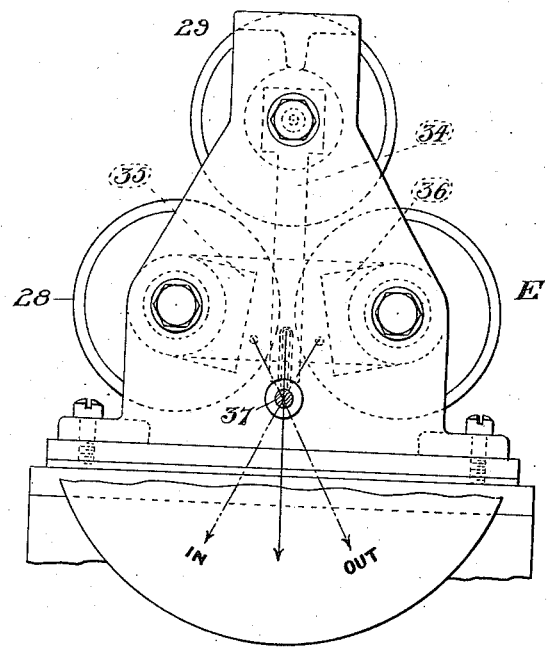

In the accompanying drawings, Figure 1 is a diagrammatic view showing an arrangement of circuits embodying our invention and mechanism controlled thereby, the solid lines indicating the positions of the parts of the instruments when the instruments are in synchronism, that is, when no staff is out of either instrument, and the dash lines indicating the positions of parts in the instruments to permit the removal of a staff from the instrument at "A". Fig. 2 is a similar view showing in solid lines the positions of the parts of the instruments after a staff has been removed from the instrument at "A", and showing in dash lines the positions of the parts of the instruments when an attempt is made to release a second staff from the instrument at "A". Figs. 3 and 4 are views showing one form of indicating device which may be used in connection with our invention.

The present invention is an improvement on the arrangement of mechanism and circuits shown and described in United States Letters Patent No. 794,423, granted to T. H. Patenall on July 11th, 1905, to which patent reference may be had for one form of the structure and for the functions of various parts embodied in the system herein described.

Referring to the drawings, M designates a holding magnet the function of which, as explained in Patent No. 794,423, above referred to, is to hold parts of the mechanism in position for removal of a staff when the magnet is properly energized. This magnet comprises two coils $M'$ and $M^2$ which for convenience of distinction we will designate hereinafter as the local magnet coil and the line magnet coil respectively. As explained in Patent No. 794,423, when current flows through the two coils of the holding magnet in opposite directions—that is, in one direction through one of the coils and in the opposite direction through the other coil—the magnet will hold the parts of the mechanism in such positions that a staff can be removed; when, however, current flows through the two coils in the same direction, the holding power of the magnet is annulled, and the magnet will not hold the parts in position for removal of a staff. In the present invention, as in the system disclosed in the above-mentioned Patent No. 794,423, the local coil of each instrument is connected in circuit with the battery at the corresponding instrument, and the line coil of each instrument is connected with the battery of the other instrument. In the present invention, however, each battery is connected directly with a pole-changer so that the direction of current flow through each local coil is determined by the position of the pole-changer for the corresponding instrument, and the direction of flow through each line coil is determined by the position of the pole-changer for the other instrument. Hence the direction of flow of current through both the local and the line coils is variable in the present invention.

The staff instruments used in a system embodying our invention may be similar to those disclosed in Patent No. 794,423 hereinbefore mentioned, except that as herein shown we employ a modified form of indicator (hereinafter described) and that in the present invention the push button of each instrument operates two circuit controllers instead of one. Obviously the bells are not required in the instruments comprised in the present system for the reason that the removal of a staff from either instrument does not require the attention of an operator at the other instrument.

In Figs. 1 and 2, E and E' designate indicators each of which comprises two magnets 28 and 29 and a pointer controlled thereby. As shown in detail in Figs. 3 and 4, an armature 34 of soft iron is pivoted at one end of the core of magnet 29, and swings between two pole-pieces 35 and 36 of magnet 28. Pointer 30 is carried by a shaft 37, to which is also secured a crank arm 39 which is engaged by a slot 38 in the armature 34. It will be evident that armature 34 will be polarized by magnet 29, and that the direction of movement of the armature will depend upon the polarity of the pole-pieces 35 and 36. Or, if the polarity of these pole-pieces remains the same, the direction of movement of the armature will depend upon the polarity of magnet 29. Hence, when currents flow through the two magnets in the same direction, the pointer will be moved to one of its extreme positions, and when the currents flow in opposite directions the pointer will be moved to its other extreme position.

Referring now particularly to Fig. 1 of the drawings, the solid lines indicate the positions occupied by the circuit controllers when the instruments are in synchronism, that is, when no staff is out of either instrument. Assuming that it is desired to remove a staff from instrument A, the person who is to operate this instrument first presses push button C inwardly, thereby closing two circuits through the magnets of indicator E, one of which includes magnet 28 and battery O, the other of which includes magnet 29 and battery O'. These circuits are as follows—from battery O through wire 6, pole changing contact 27, wires 7, 9, and 11, contact 52, wires 12 and 13, indicator magnet 28, wire 14, circuit controller of push button C, wire 15, contact 26, wire 16 to battery O; and from battery O' at instrument B through wire 6, contact 25, wires 7 and 17, wire 9 of instrument A, contact 53, wires 18 and 19, indicator magnet 29, wire 20, circuit controller of push button C, wire 21, circuit controller of push button C' at instrument B, wire 15, contact 24, wire 16 to battery O'. The two magnets 28 and 29 of indicator E are thereby energized, and by currents flowing in such relative directions that the pointer 30 will indicate "staff in." Having received this indication that the instruments are in synchronism, the operator next manipulates the apparatus in the usual manner to bring armature 51 into contact with magnet M, thereby shifting the contacts of circuit controller P into the position indicated in dash lines, still pressing inwardly upon push button C. The shifting of contact 53 of circuit controller P changes the circuit of indicator magnet 28 and battery O to include coil M' of holding magnet M, the circuit then being as follows: as traced before to wire 9, then through contact 53, wire 10, coil M', wire 31, resistance 8, wire 32 to wire 13, thence back to battery O as before traced. The shifting of contact 53 of circuit controller P also changes the circuit of indicator magnet 29 and battery O' to include coil $M^2$ of instrument A, the circuit then being as follows: as before traced to wire 9 of instrument A, then through contact 53, wire 10, coil $M^2$ to wire 19, thence back to battery O' as before traced. It will be seen therefore that an auxiliary circuit is provided around both the local coil and the line coil of each instrument, and that these auxiliary circuits are controlled by controller P.

With the currents from the two batteries flowing through coils M' and $M^2$ as just traced, the armature 51 will be held up by holding magnet M, and a staff can be removed from instrument A. The removal of a staff will in the usual manner cause a reversal of the position of the contacts of pole-changer D of this instrument, these contacts then assuming the positions shown in Fig. 2. Current from battery O will then flow in the opposite direction to that traced hereinbefore through coil M' and polarized magnet 28, the new circuit being as follows: from battery O through wire 6, contact 27, wires 33 and 15, circuit controller of push button C, wire 14, indicator magnet 28, wires 13 and 32, resistance 8, wire 31, coil M' wire 10, contact 53, wires 9 and 7, contact 26, wire 16 to battery O. The direction of flow of current in coil $M^2$ is however not changed. Since the currents in the two coils M' and $M^2$ now flow in the same relative directions, the holding power of magnet M is annulled, and armature 51 drops to its initial position, shifting the contacts of circuit controller P to their initial position indicated in full lines in Fig. 1. The flow of current in the reverse direction through indicator magnet 28 moves the pointer 30 to the position indicating "staff out." When push button C is released the circuits of both batteries will be opened.

The circuits for the release of a staff from instrument B would be similar to those just traced for instrument A, hence they need not be traced in detail. In this case the local coil M' of instrument B would be connected in a circuit including battery O' and pole-changer D', and the line coil of the same instrument would be connected in a circuit including battery O and pole-changer D.

Referring now to Fig. 2, the solid lines indicate the positions of the circuit controllers after the removal of a staff from instrument A. Assume now that an attempt should be made to release a second staff from the same instrument. Upon pressing push button C, it is clear from the foregoing description that the direction of flow of current in the two indicator magnets 28 and 29 would be such as to cause the pointer 30 to indicate "staff out." If in spite of this indication the operator should raise armature 51 in a further attempt to release a staff, the direction of flow of current in the two coils M' and $M^2$ would be such as to annul the holding power of magnet M, hence the parts of the mechanism would not be held by this magnet in position for release. If, after the removal of a staff from instrument A, an attempt should be made to remove a staff from instrument B, it would be found that the holding power of magnet M of the latter instrument is annulled, owing to the fact that the polarity of the current from battery O flowing in line coil $M^2$ is reversed by the position of pole-changer D of instrument A. This fact would also be immediately indicated to the operator at B upon pressing push button C, by the movement of the pointer 30 of indicator E' to "staff out" position. Upon an attempt to release a staff from either instrument after the removal of one from instrument B, the holding power of magnet M of either instrument would be annulled as hereinbefore explained, and a staff could not be released.

As will be clear from the preceding explanation, the removal of a staff from either instrument will reverse the position of the pole-changer D or D' of that instrument, and upon a subsequent attempt to remove another staff from either of the instruments the direction of flow of current in either the local or the line coil of such instrument will be such as to annul the holding power of magnet M. When, however, the staff which was removed from one instrument is replaced in the same instrument, the pole-changer D or D' of that instrument is moved back to its original position and the two instruments are again in synchronism. Or if the staff is placed in the other instrument, the pole-changer D or D' of such other instrument is reversed, thus placing the two pole-changers D and D' in corresponding positions, and the instruments are in synchronism.

It will be clear from the foregoing explanation that in a system embodying our invention the circuit for the line magnet coil of each instrument is normally open only at the push button of the corresponding instrument. The circuit for the local magnet coil of each instrument is of course controlled at the corresponding instrument. Hence both of these circuits for either instrument may be closed by an operator at the corresponding instrument without the coöperation of an operator at the other instrument. The system may therefore be operated by train or car crews if so desired. It will be noted that we accomplish this mode of operation with the use of but three line wires extending between the two instruments.

Although we have herein shown and described only one staff system embodying our invention, it is understood that various modifications may be made therein within the scope of the appended claims without departing from the spirit and scope of our invention.

Having thus described our invention what we claim is—

1. In combination, two staff instruments, a magnet for each instrument each comprising a local coil and a line coil, a battery and a pole-changer for each instrument, a circuit for the local coil of each instrument each of which circuits includes the battery and the pole-changer of the corresponding instrument, a circuit for the line coil of each instrument each of which circuits includes the battery and the pole-changer of the other instrument, and means in each instrument actuated by the insertion of a staff in and also by the removal of a staff from the instrument for reversing the pole-changer of that instrument.

2. In combination, two staff instruments, a magnet for each instrument each comprising a local coil and a line coil, a battery and a pole-changer for each instrument, a circuit for the local coil of each instrument, a circuit for the line coil of each instrument, a circuit controller at each instrument for connecting the battery and pole-changer of the corresponding instrument with the local coil of such instrument or with the line coil of the other instrument, and means in each instrument actuated by the insertion of a staff in and also by the removal of a staff from the instrument for reversing the pole-changer of that instrument.

3. In combination, two staff instruments, a magnet for each instrument each comprising a local coil and a line coil, a battery and a pole-changer for each instrument, three line wires extending between the two instruments one of which is a common wire; a circuit for each local coil each including the battery and pole-changer of the corresponding instrument; a circuit for each line coil each including the battery and pole-changer of the other instrument, one of said line coil circuits including the common wire and one other line wire, and the other line coil circuit including the common wire and the remaining line wire and means in each instrument actuated by the insertion of a staff in and also by the removal of a staff from the instrument for reversing the pole-changer of that instrument.

4. In combination, two staff instruments, a magnet for each instrument each comprising a local coil and a line coil, a battery and a pole-changer for each instrument, a circuit for the local coil of each instrument, a circuit for the line coil of each instrument, a circuit controller at each instrument for connecting the battery and pole-changer of the corresponding instrument with the local coil of such instrument or with the line coil of the other instrument; a second circuit controller at each instrument for opening and closing the circuit of the line coil of the corresponding instrument, and means in each instrument actuated by the insertion of a staff in and also by the removal of a staff from the instrument for reversing the pole-changer of that instrument.

5. In combination, two staff instruments, a magnet for each instrument each comprising a local coil and a line coil, a battery and a pole-changer for each instrument, a circuit for the local coil of each instrument, and a circuit for the line coil of each instrument, a push button in each instrument, two circuit controllers operated thereby one of which is included in the circuit of the line coil for the corresponding instrument and is normally open, and the other of which circuit controllers is adapted to connect the battery and pole-changer of the corresponding instrument with the local coil of the same instrument or with the line coil of the other instrument and is normally in position to effect the last-mentioned connection, and means in each instrument actuated by the insertion of a staff in and also by the removal of a staff from the instrument for reversing the pole-changer of that instrument.

6. In combination, two staff instruments, a magnet for each instrument each comprising a local coil and a line coil, a battery and a pole-changer for each instrument, a circuit for the local coil of each instrument, a circuit for the line coil of each instrument, a circuit controller at each instrument each for connecting the battery and pole-changer of the corresponding instrument with the local coil of such instrument or with the line coil of the other instrument, said circuit controller being normally in position to effect the last-mentioned connection, and a second circuit controller at each instrument for opening and closing the circuit of the line coil for the corresponding instrument whereby the circuit of each line coil may be closed at the corresponding instrument independently of the other instrument, and means in each instrument actuated by the insertion of a staff in and also by the removal of a staff from the instrument for reversing the pole-changer of that instrument.

7. Two staff instruments, a magnet for each instrument each comprising a local coil and a line coil, circuits for the coils a battery for each instrument, a push button for each instrument, and a circuit controller operated by each push button for connecting the battery at the corresponding instrument with the circuit of the local coil of said corresponding instrument or with the circuit of the line coil of the other instrument according to the position of the said circuit controller.

8. In combination, two staff instruments, an indicator for one of the instruments comprising two magnets and a movable armature responsive to the relative direction of the currents of the two magnets, a battery and a pole-changer for each instrument, a circuit for one indicator magnet including the battery and pole-changer of the corresponding instrument, and a circuit for the other indicator magnet comprising the battery and pole-changer of the other instrument, and means in each instrument actuated by the insertion of a staff in and also by the removal of a staff from the instrument for reversing the pole-changer of that instrument.

9. In combination, two staff instruments, an indicator for each instrument comprising two magnets, circuits for the magnets a battery and a pole-changer for each instrument, and a circuit controller for each instrument for connecting the battery and pole-changer of the corresponding instrument in circuit with an indicator magnet of the same instrument or in circuit with an indicator magnet of the other instrument, and means in each instrument actuated by the insertion of a staff in and also by the removal of a staff from the instrument for reversing the pole-changer of that instrument.

10. In combination, two staff instruments, a magnet for each instrument each comprising a local coil and a line coil, an indicator for each instrument each comprising two magnets and a movable armature responsive to the relative direction of the currents in the two magnets, a battery and a pole-changer for each instrument, and contacts and conductors for connecting the battery and pole-changer of each instrument with the local coil and one indicator magnet of the same instrument or with the line coil and an indicator magnet of the other instrument.

11. In combination, two staff instruments, a magnet for each instrument each comprising a local coil and a line coil, an indicator for each instrument each comprising two magnets, a battery and a pole-changer for each instrument, contacts and conductors for connecting the battery and pole-changer of each instrument with the local coil and one indicator magnet of the same instrument or with the line coil and an indicator magnet of the other instrument; an auxiliary circuit around each local coil, an auxiliary circuit around each line coil, a circuit controller for opening and closing each auxiliary circuit, and means in each instrument actuated by the insertion of a staff in and also by the removal of a staff from the instrument for reversing the pole-changer of that instrument.

12. In combination, two staff instruments, a holding magnet for each instrument each comprising a local coil and a line coil, an armature for each holding magnet, an indicator for each instrument each comprising two magnets, a battery and a pole-changer for each instrument, contacts and conductors for connecting the battery and pole-changer of each instrument with the local coil and one indicator magnet of the same instrument or with the line coil and one indicator magnet of the other instrument, an auxiliary circuit around each local coil and an auxiliary circuit around each line coil, and a circuit controller operatively connected with each armature and adapted to open or close the said auxiliary circuits for the corresponding instrument according to whether or not the armature is closed against its magnet, and means in each instrument actuated by the insertion of a staff in and also by the removal of a staff from the instrument for reversing the pole-changer of that instrument.

13. In combination, two staff instruments, a magnet in each instrument comprising a local coil and a line coil, a battery for each instrument, means for connecting the battery at each instrument with the local coil of that instrument or with the line coil of the other instrument, and means in each instrument actuated by the insertion of a staff in and also by the removal of a staff from that instrument for reversing the polarity of the current delivered by the battery at that instrument to either of said coils with which it may be connected.

14. In combination, two staff instruments, a magnet in each instrument comprising a local coil and a line coil, a battery and a pole-changer for each instrument, means for connecting the battery and pole-changer of each instrument with the local coil of that instrument or with the line coil of the other instrument, and means in each instrument actuated by the insertion of a staff in and also by the withdrawal of a staff from the instrument for reversing the pole-changer of that instrument.

15. In combination, two staff instruments, a magnet in each instrument comprising a local coil and a line coil, a battery and a pole-changer for each instrument, three line wires extending between the two instruments one of which is a common wire, a circuit for each local coil and a circuit for each line coil, the circuit for one line coil including the common wire and one other line wire, and the circuit for the other line coil including the common wire and the remaining line wire, means in each instrument for connecting the battery and pole-changer of that instrument with the local coil of that instrument or with the line coil of the other instrument, and means in each instrument actuated by the insertion of a staff in and also by the withdrawal of a staff from the instrument for reversing the pole-changer of that instrument.

16. In combination, two staff instruments, a magnet in each instrument comprising a line coil, a battery and a pole changer for each instrument, three line wires extending between the two instruments one of which is a common wire, a circuit for each line coil each of which includes the battery and pole-changer of the other instrument, one of which circuits includes the common wire and one other line wire and the other of which circuits includes the common wire and the remaining line wire, and means in each instrument actuated by the insertion of a staff in and also by the withdrawal of a staff from the instrument for reversing the pole-changer of that instrument.

17. In combination, two staff instruments, a magnet in each instrument comprising a line coil, a battery and a pole-changer for each instrument, a circuit for each line coil each of which includes the battery and pole-changer of the other instrument but not the pole-changer in the instrument having such line coil, and means in each instrument actuated by the insertion of a staff in and also by the withdrawal of a staff from the instrument for reversing the pole-changer of that instrument.

18. A staff instrument, a magnet therein comprising a local coil, a source of current for the instrument, a circuit for the local coil including the source of current, and means included in said circuit and actuated by the insertion of a staff in and also by the removal of a staff from the instrument for reversing the polarity of the current supplied by said source to the local coil.

19. A staff instrument, a magnet therein comprising a local coil, a battery and a pole-changer for the instrument, a circuit for the local coil including the battery and the pole-changer, and means actuated by the insertion of a staff in and also by the removal of a staff from the instrument for reversing the pole-changer.

20. In combination, two staff instruments, an indicator in each instrument comprising two magnets and a movable armature responsive to the relative direction of the currents in the two magnets, a battery and a pole-changer for each instrument, means for connecting the battery and pole-changer of each instrument with a magnet of that instrument or with a magnet of the other instrument, and means in each instrument actuated by the insertion of a staff in and also by the withdrawal of a staff from the instrument for reversing the pole-changer of that instrument.

21. In combination, two staff instruments, an indicator in each instrument comprising two magnets and a movable armature responsive to the relative direction of the currents in the two magnets, a battery for each instrument, means for connecting the battery at each instrument with a magnet of that instrument or with a magnet of the other instrument, and means in each instrument actuated by the insertion of a staff in and also by the removal of a staff from that instrument for reversing the polarity of the current delivered by the battery at that instrument.

22. In combination, two staff instruments, a magnet in each instrument each comprising a local coil and a line coil, an indicator for each instrument each comprising two magnets, a circuit for each local coil each circuit including an indicator magnet of the same instrument, and a circuit for each line coil each including the other indicator magnet of the same instrument, a battery and a pole-changer for each instrument, a circuit controller in each instrument for connecting the battery and pole-changer of that instrument with the circuit of the local coil of that instrument or with the circuit of the line coil of the other instrument, and means in each instrument actuated by the insertion of a staff in and also by the withdrawal of a staff from the instrument for reversing the pole-changer of that instrument.

23. In combination, two staff instruments, a magnet in each instrument comprising a local coil and a line coil, a battery for each instrument, a pole-changer for each instrument constantly connected with the battery for that instrument, means for connecting the battery and pole-changer of each instrument with the local coil of that instrument or with the line coil of the other instrument, and means in each instrument actuated by the insertion of a staff in and also by the withdrawal of a staff from the instrument for reversing the pole-changer of that instrument.

24. In combination, two staff instruments, a magnet in each instrument comprising a local and a line coil, a battery for each instrument, contacts and conductors for connecting the battery of each instrument with the local coil of that instrument or with the line coil of the other instrument, and means at each instrument for reversing the polarity of the current delivered by the battery of that instrument to whichever of the said coils with which it may be connected.

25. In combination, two staff instruments, a magnet in each instrument comprising a local coil and a line coil, a battery and a pole-changer for each instrument, and contacts and conductors for connecting the battery and pole-changer of each instrument with the local coil of that instrument or with the line coil of the other instrument.

In testimony whereof we affix our signatures in presence of two witnesses.

THOMAS H. PATENALL.
HENRY S. YOUNG.

Witnesses:
  F. J. PILLSBURY,
  A. L. VENCILL.

---

Copies of this patent may be obtained for five cents each, by addressing the "Commissioner of Patents, Washington, D. C."